Sept. 21, 1926.  1,600,395
C. BRYNOLDT
APPARATUS FOR FORMING CONCRETE STRUCTURES
Filed April 13, 1920    9 Sheets-Sheet 3
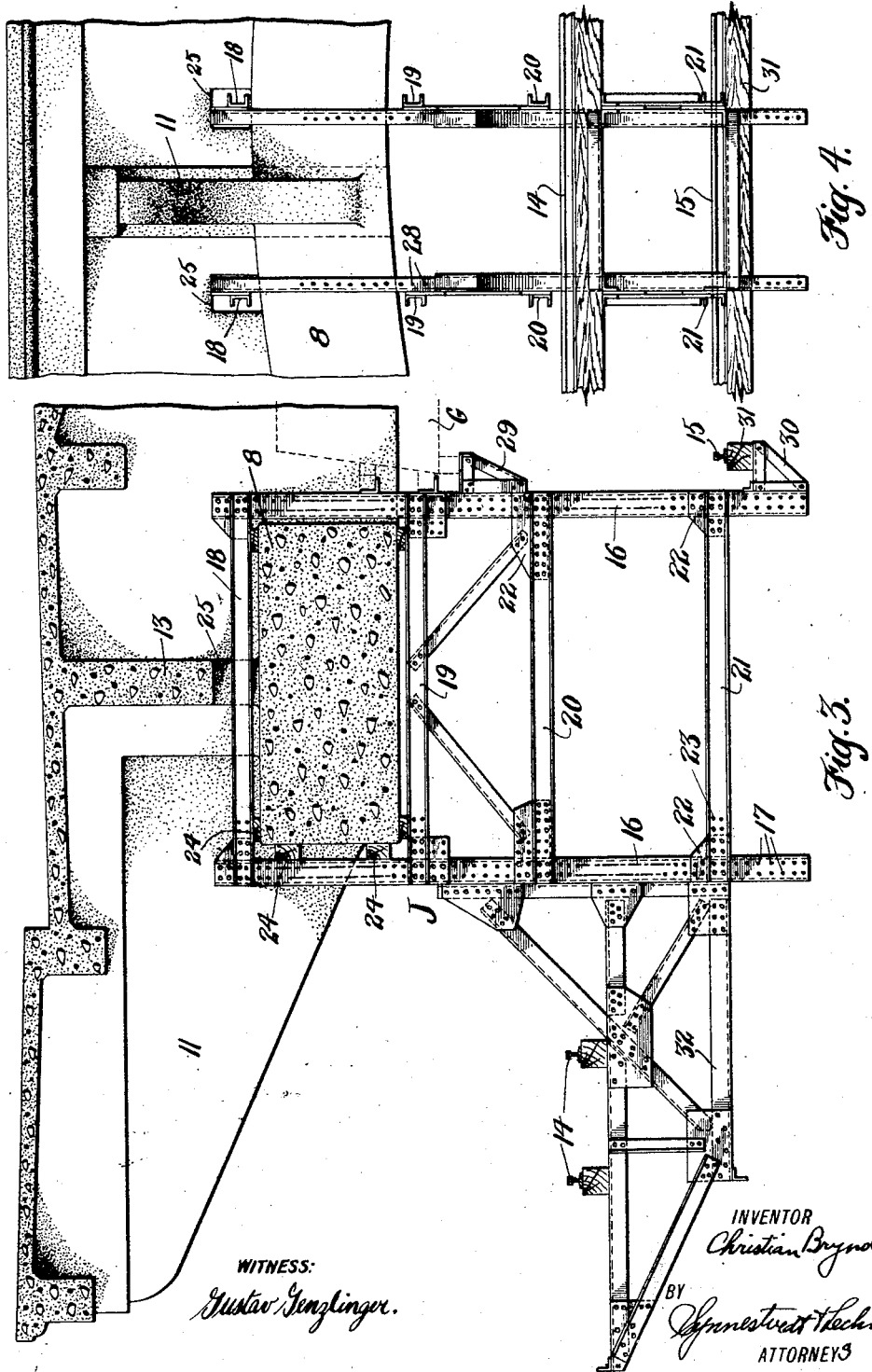

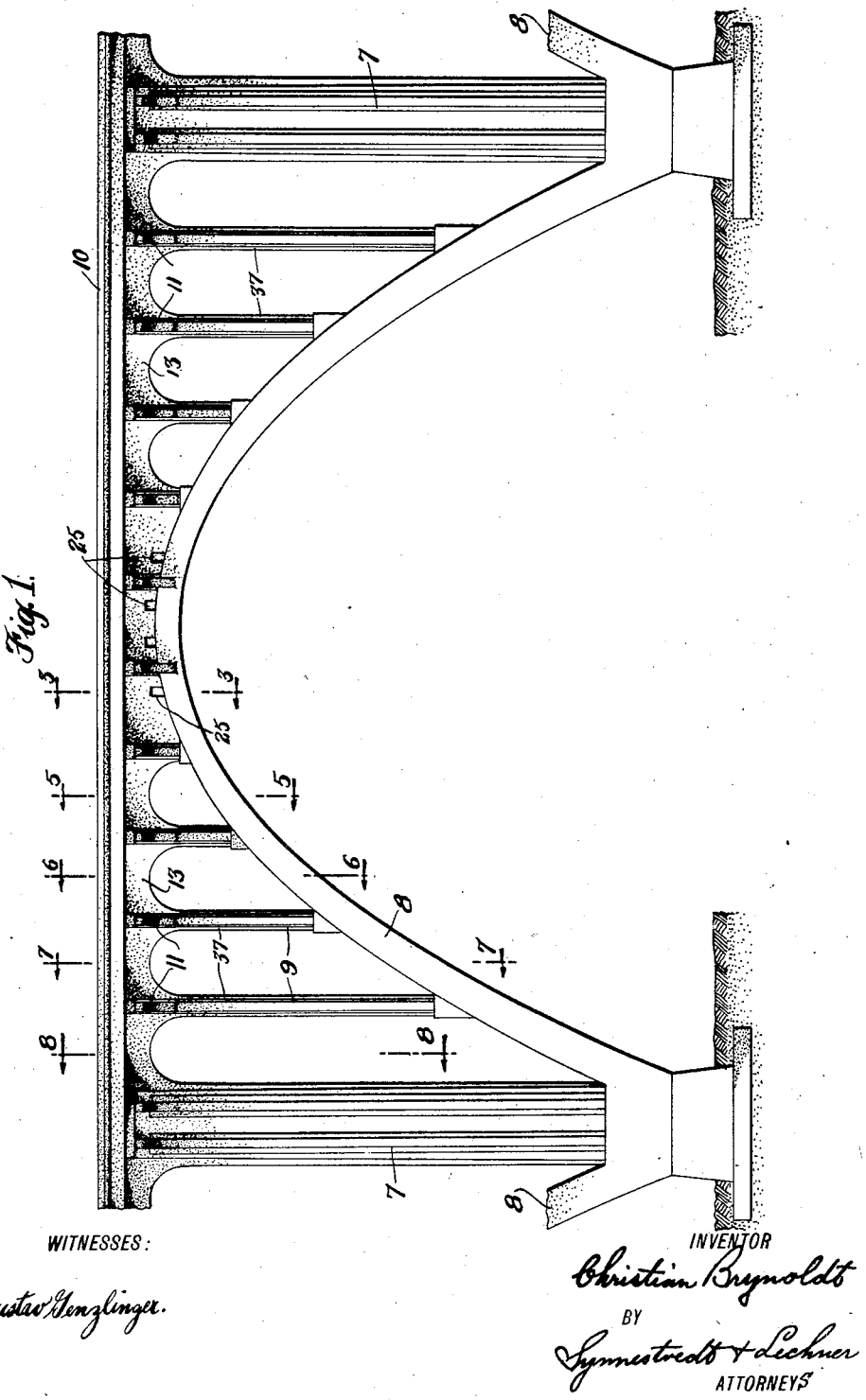

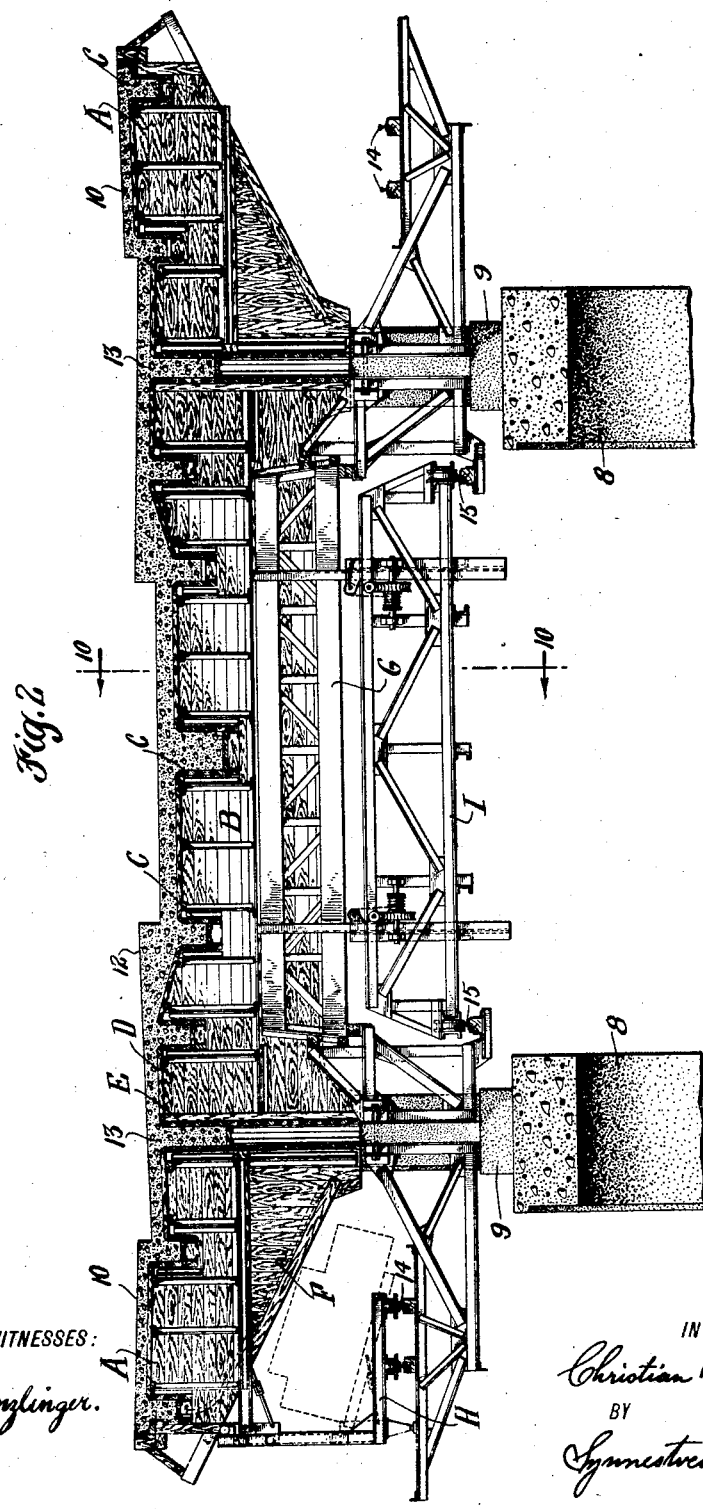

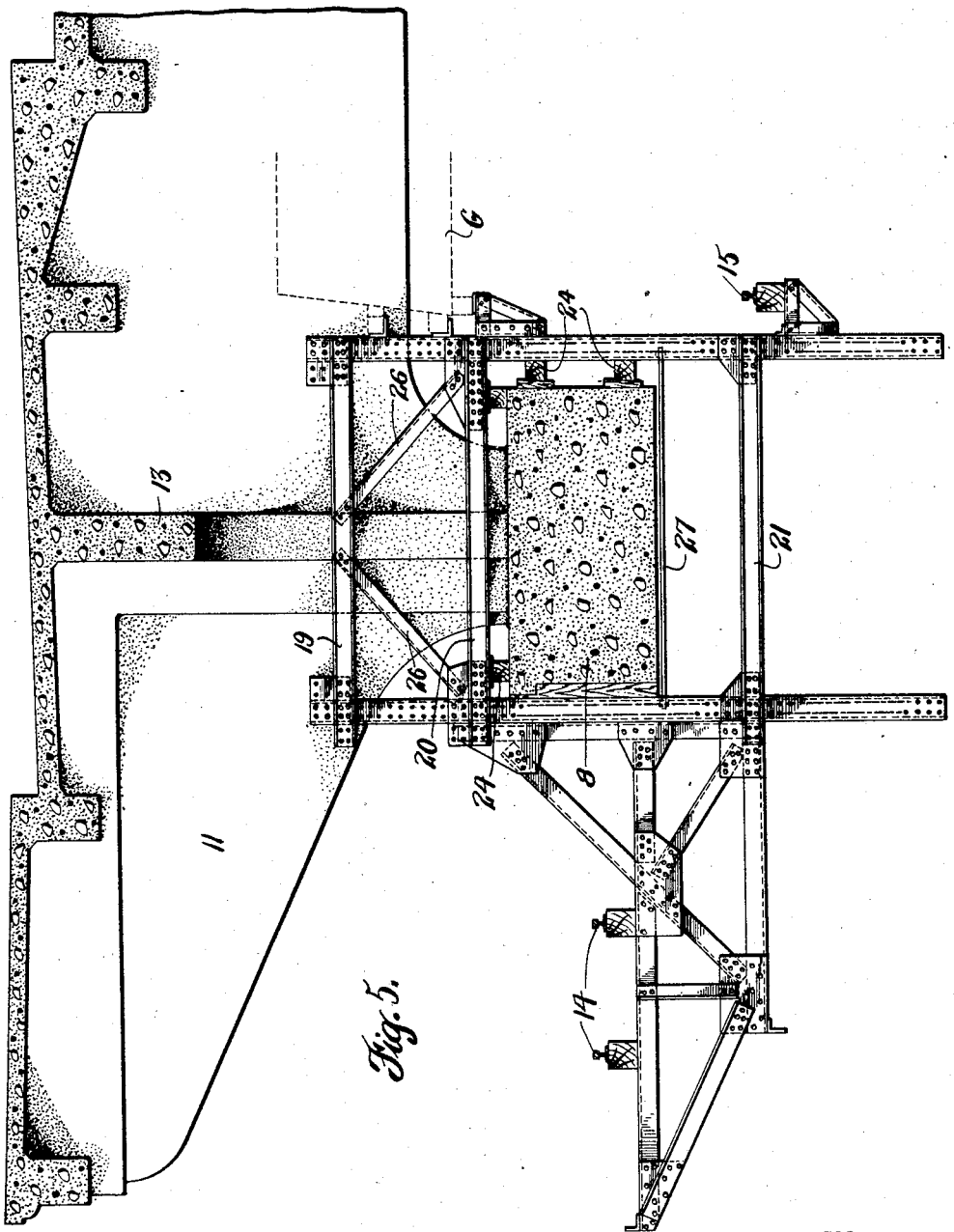

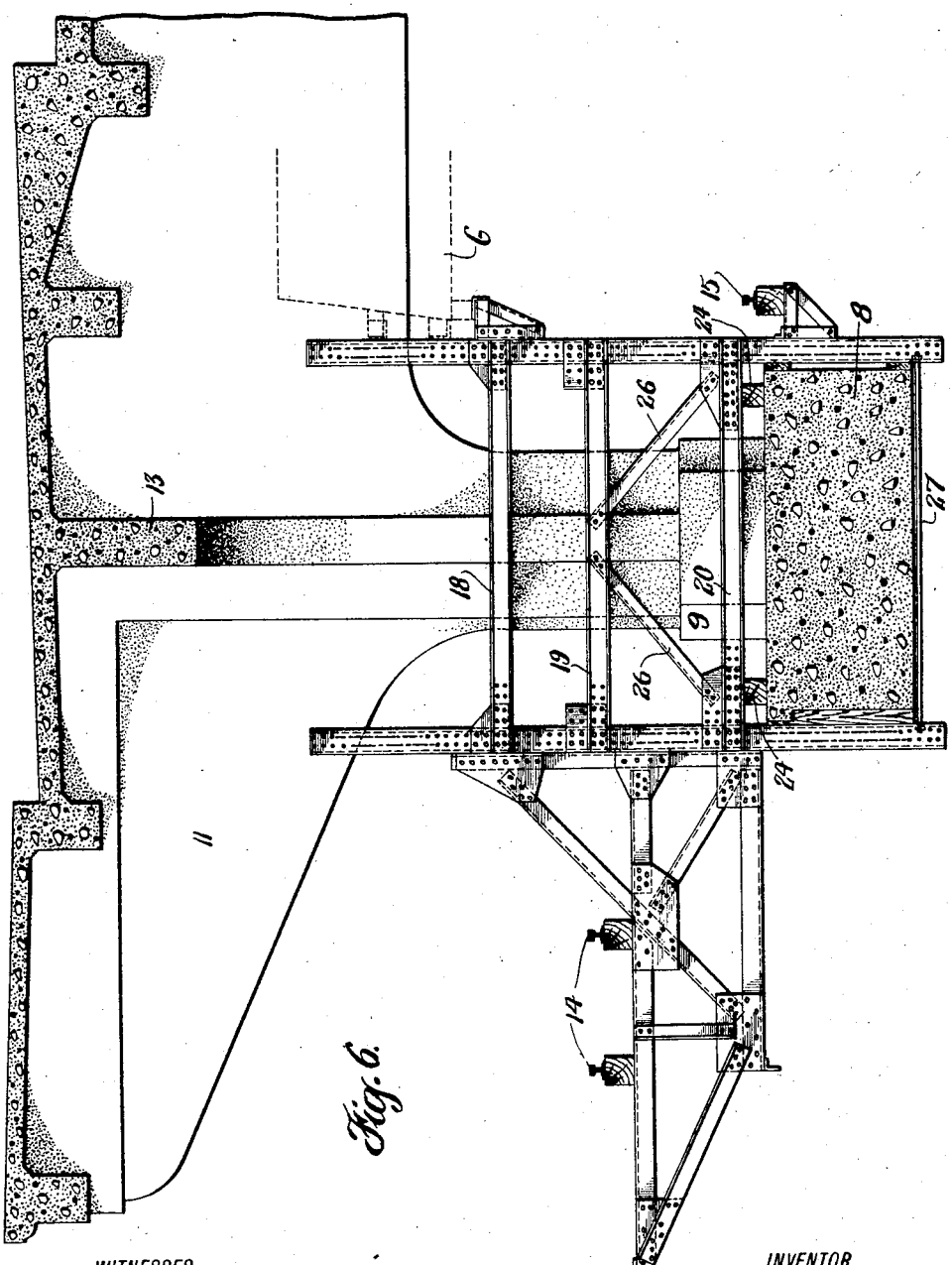

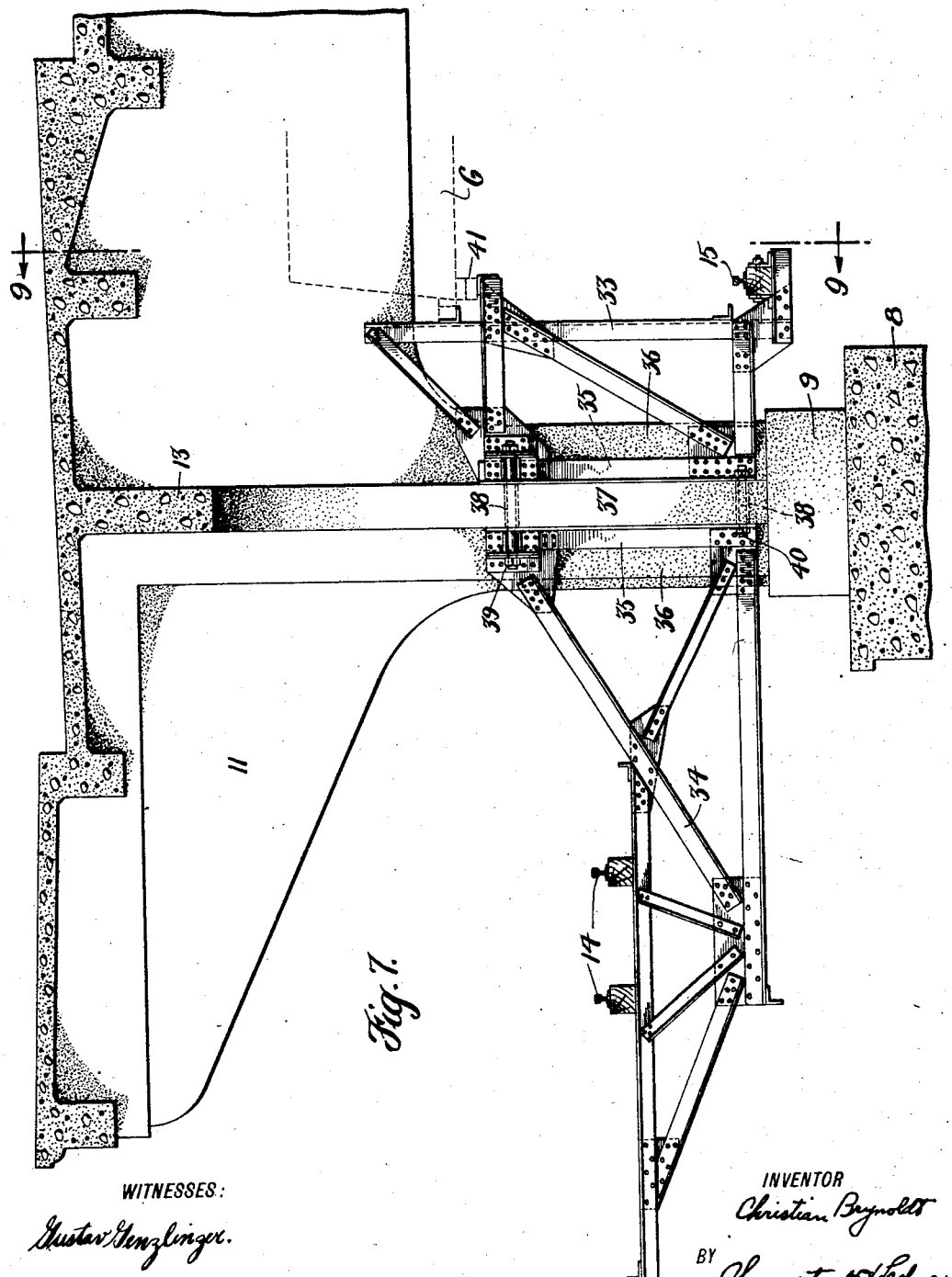

Sept. 21, 1926.  
C. BRYNOLDT  
1,600,395  
APPARATUS FOR FORMING CONCRETE STRUCTURES  
Filed April 13, 1920  9 Sheets-Sheet 7
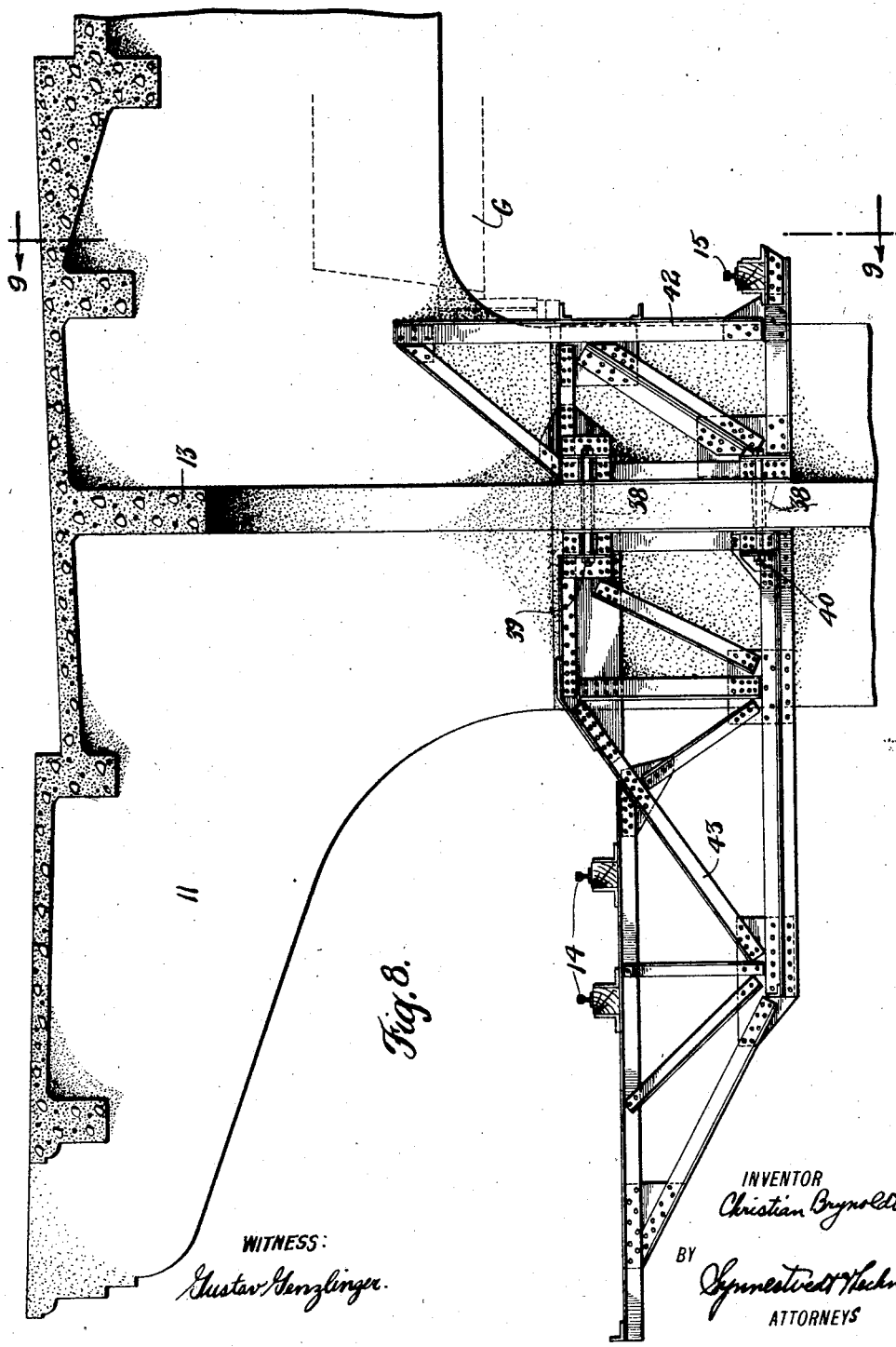

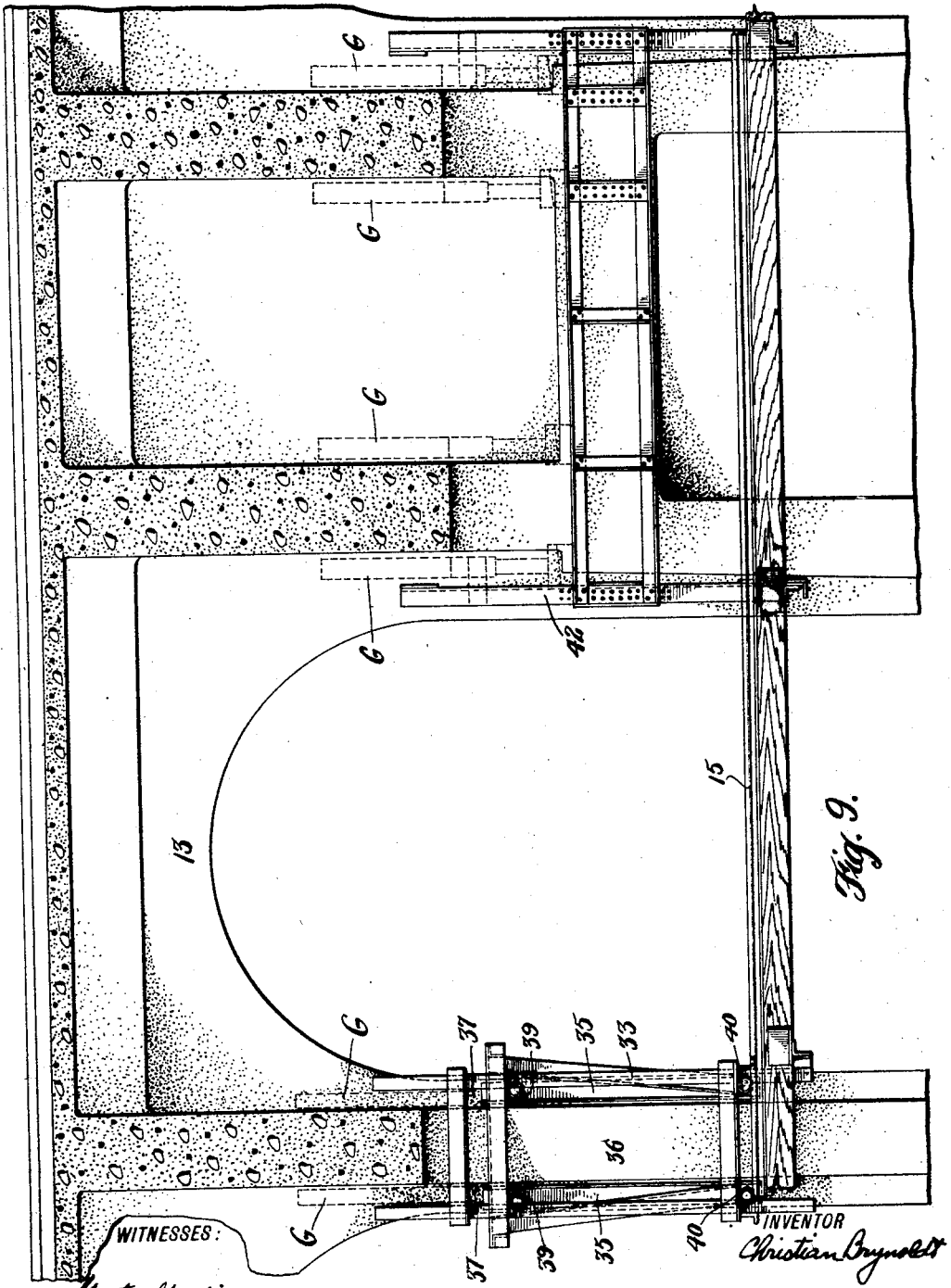

Sept. 21, 1926.  
C. BRYNOLDT  
1,600,395  
APPARATUS FOR FORMING CONCRETE STRUCTURES  
Filed April 13, 1920  
9 Sheets-Sheet 9
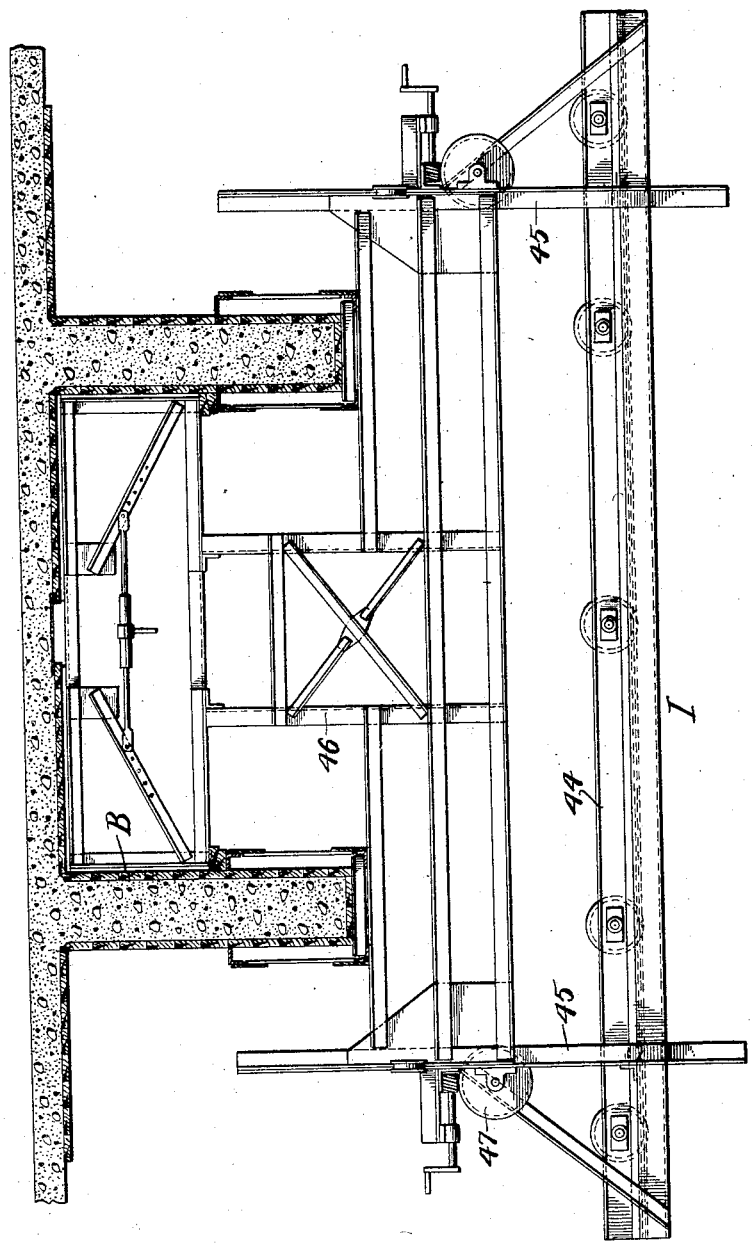
WITNESSES:  
Gustav Genzlinger.
INVENTOR  
Christian Brynoldt  
BY  
ATTORNEYS Patented Sept. 21, 1926.

1,600,395

UNITED STATES PATENT OFFICE.

CHRISTIAN BRYNOLDT, OF PITTSBURGH, PENNSYLVANIA, ASSIGNOR TO BLAW-KNOX COMPANY, A CORPORATION OF NEW JERSEY.

APPARATUS FOR FORMING CONCRETE STRUCTURES.

Application filed April 13, 1920. Serial No. 373,530.

This invention relates to a method of and apparatus for molding concrete structures, such for example, as bridges and similar structures high in the air.

In certain of its aspects my present invention consists of an improvement over the apparatus shown and described in my copending application Serial No. 373,527 filed Apr. 13, 1920 (since issued on January 3rd, 1922 as Patent No. 1,402,143), and it has for one of its primary objects the provision of improved apparatus for rendering the invention of the aforesaid application more widely applicable.

Another of the important objects of my invention resides in the provision of an improved method of forming concrete structures of the character described which is simple, expeditious, and economical in labor and materials, and in the provision of improved apparatus for carrying out such method.

The foregoing, together with such other objects as may hereinafter appear, or are incident to my invention, I obtain by means of a construction which I have illustrated in preferred form in the accompanying drawings, wherein:

Fig. 1 is a side elevation of a portion of a bridge of one type for the construction of which the present improvements are applicable; Fig. 2 is a cross section taken through the bridge at some point intermediate the piers, illustrating the form apparatus in place; Fig. 3 is an enlarged sectional view illustrating the construction of the arch brackets forming a part of my invention and their disposition when used at the point marked 3—3 of Fig. 1; Fig. 4 is an end elevation of Fig. 3; Fig. 5 is a section similar to Fig. 3 illustrating the disposition of the arch brackets when used at the point marked 5—5 of Fig. 1; Fig. 6 is a sectional view showing the brackets as used at the point 6—6 of Fig. 1; Fig. 7 is a sectional view illustrating a column bracket such as would be used, for example, at point 7—7 of Fig. 1; Fig. 8 is a sectional view taken at the point 8—8 of Fig. 1 to illustrate a pier bracket, also forming a part of the first invention; Fig. 9 is a section taken on the lines 9—9 of Figs. 7 and 8; and Fig. 10 is an enlarged section taken on the line 10—10 of Fig. 2.

The present improvements will be best understood by brief reference to the apparatus shown and described in the aforesaid copending application. In the construction there shown I propose to mold the longitudinal concrete girders, beams, cantilevers, and the deck and sidewalk structures by means of box frames and other mold sections, for all of which a supporting mechanism is provided consisting of longitudinal steel beams, which are provided with a plurality of laterally projecting brackets, certain of which carry the mold members for forming the cantilevers and sidewalks, while others support the cross trusses, which in turn support the box frames molding the deck slab and the concrete girders and beams. The cantilever brackets carry tracks for travelers which are utilized in the erecting, taking down, and shifting the cantilever and sidewalk forms, while other portions of the steel supporting structure carry rails for a central traveler, moving longitudinally of the bridge, which traveler is adapted to set up, take down, and transport the box frames and other mold sections utilized in forming the intermediate portions of the bridge. The steel structure is left in place supporting such portions of the mold only as are necessary to properly support the concrete until it has fairly set, the remaining portions of the form being capable of being taken down a relatively short period after the pouring.

Fundamentally the apparatus of the present invention is substantially the same as that just described; but it nevertheless affords important distinctive advantages.

In the bridge illustrated in Fig. 1, the preferred sequence of operations is to erect the piers 7, then the main structural or load-carrying span members comprising the ribs or arches 8, next the intermediate columns 9, and lastly the floor system. The floor system consists of the sidewaks 10 and their cantilevers 11, and the deck or floor 12, suitably divided for road and track vehicles, and the longitudinal concrete beams 13 and the other beams shown in Fig. 2 which supports the deck. In addition to these, there are cross beams connecting columns and piers and the beams located at intermediate points, such beams not being shown. These parts are molded in the general manner described in the aforesaid application by box frames A and B, beam molds C, and other mold members, such as the sections D, E, and F, for example. The box frames C are supported in place by means of the cross trusses G, which also form the bottom molds for the cross beams.

It is with the manner of supporting such parts as these (A, B, C, D, E, F, and G), and of shifting them from one part of the bridge to another, that my present invention is more especially concerned.

The box frames are collapsible and are set up and taken down, transported for setting up at a new point by means of the travelers H and I, respectively, and these travelers are also used to shift and set up the other mold parts.

The travelers H which handle the cantilever and sidewalk molds ride on tracks 14, while the traveler I for handling the intermediate portions of the mold structure rides on the rails 15. The manner in which the tracks and certain other portions of the apparatus are supported will now be described.

The supporting means consist of a plurality of brackets, of which there are three types; namely, the arch brackets, the column brackets, and the pier brackets. The arch brackets, which I have indicated as a whole by the reference letter J, are shown in Figs. 3 to 6, inclusive, to which attention is directed.

These arch brackets each have a means for supporting the rails 14 for the travelers H, a means for supporting a rail 15 for the traveler I, and a means for supporting the ends of the cross trusses G; and it will be observed that, owing to the curvature of the arches, provision must be made to compensate for the different levels at which the several brackets will be carried in order that these several supporting means will come at proper levels for the support of the respective members carried thereby. To meet these varying conditions I construct the brackets as follows:

The main frame of each bracket consists of four upright corner posts 16, preferably channels, the webs of which are provided with a plurality of holes 17, extending substantially throughout the length of the posts; and the plurality of pairs of transverse channels 18, 19, 20 and 21. The transverse channels have gusset plates 22 at the end and these plates and the channels themselves are provided with holes 23. The channels are bolted together by suitable bolts and it will be seen that the arrangement of holes is such that the frame may be varied in width, while the elevation of the transverse channels may be altered, or the channels themselves transposed in position. The channels 18 are bolted to the channels 16 after the frame of the bracket has been positioned about the arch. Wedges 24 serve to securely position the brackets in level position on the arch. In those portions of the bridge in which the beams 13 merge with the arches, holes 25 are provided for the insertion of the channels 18. Here the brackets are in effect erected upward from the arch.

In Fig. 3 the main frame is secured at its top to the arch; while in Fig. 5, which is a section through a lower portion of the arch, the relative position of the frame with respect to the arch is much higher, the arch coming about the middle of the frame. In adapting the frame for this point, the channels 18 are removed and the channels 19 and 20, which are connected by the braces 26 are shifted to the top and the frame is in effect suspended therefrom.

Tie rods 27 may be provided immediately below the arch to tie the sides of the frame together, and it is also desirable to shift the lower channels 21 to a higher level than shown in Fig. 3 for example. In Fig. 6 the frame is shown as adapted to a still lower portion of the arch and in this adaptation the lower channels 21 are removed and the channels 18, 19 and 20 have been shifted downwardly, the channels 20 resting on the arch, and the corner channels being tied together, as before, by means of tie rods 27 located below the arch.

The foregoing affords one compensating adjustment to meet conditions arising from the curvature of the arch, but this would be insufficient ordinarily, unless the frames were to be made of great length. The additional compensating adjustment is provided as follows: The outer legs of the corner channels 16 are also provided with a plurality of holes 28 by means of which the respective levels of the brackets 29, which are adapted to support the steel trusses G, and the brackets 30 which carry the stringers 31 to which the rails 15 are secured, may be adjusted. It will be understood that the brackets 29 and 30 are secured by means of bolts as before. Similarly the laterally projecting framework 32 which affords the means for supporting the tracks 14 for the travelers H are bolted to the opposite pair of upright channels 16 and can be adjusted vertically with respect thereto. I thus provide a compound adjustment by means of which I can adjust the brackets 29, 30 and 32 to any level necessary to properly support the members respectively carried thereby.

The column brackets will now be described. These brackets are used where the arch is too low to permit of the use of the arch brackets heretofore described. The column brackets consist of two frames 33 and 34, each being composed of suitable structural steel members or the like and each being provided with vertical members 35 at their inner ends. The frames fit or embrace the ribs 36 of the column. The ribs 37 of the columns have holes extending therethrough, such holes being preferably formed by casting short pieces of pipe 38 in place. Bolts 39 and 40 are adapted to be inserted in these pipes and serve to bolt together the two frames 33 and 34, as shown in Fig. 7. The steel cross trusses G are supported on an upper portion of the frames 33 by means of the wedges 41; and the rails 15 are supported from a lower portion of the frames. The frames 34 project laterally underneath the cantilever and sidewalk portions of the bridge and serve to support the tracks 14.

The pier brackets are shown in Fig. 8, such brackets consisting of a pair of frames 42 and 43, quite similar to the frames 33 and 34 of the column brackets but being larger and more stoutly constructed. The frames 42 and 43 are bolted together to the ribs of the pier in the same manner as the column brackets.

In Fig. 9 the column brackets are shown in end elevation at the left hand and the pier brackets are shown in end elevation at the right hand of the figure.

The traveler I is shown on enlarged scale in Fig. 10 in side elevation, and it will be seen that it comprises a frame work 44 having guide posts 45 for a platform 46 which may be raised and lowered by any suitable means, diagrammatically indicated at 47. The platform is shown in position to support one of the frames B.

I claim:

1. The combination with bridge piers and load-carrying concrete span members, of means for supporting and transporting lengthwise of the bridge apparatus for molding incompleted concrete portions thereof, and removable means for supporting said latter means from and alongside said piers and span members comprising brackets alternatively erectable and adjustable upward or suspensible and adjustable downward from said arches, to compensate for their variation in height.

2. The combination with bridge piers, load-carrying concrete span arches, and intermediate columns, of means for supporting and transporting lengthwise of the bridge apparatus for molding its concrete superstructure, and removable means for supporting said latter means from and alongside said piers, arches, and intermediate columns.

3. The combination with bridge piers and load-carrying concrete span arches, of means for supporting and transporting lengthwise of the bridge apparatus for molding incompleted concrete portions thereof, and removable means for supporting said latter means at the opposite sides of the aforesaid bridge members, comprising brackets resting on the arches and brackets carried by the piers.

4. A supporting bracket-like member adapted to engage a portion of a concrete bridge or the like comprising a frame composed of members separably secured together externally of and adapted to embrace a portion of the bridge, said frame being provided with means for adjustment.

5. A supporting bracket-like member adapted to engage a portion of a concrete bridge or the like comprising a frame comprised of members separably secured together and adapted to embrace a portion of the bridge, and supporting means adjustably carried on the frame.

6. A supporting bracket-like member adapted to engage a portion of a concrete bridge or the like comprising a frame comprised of members separably secured together and adapted to embrace a portion of the bridge, said frame being provided with means for adjustment, and supporting means adjustably carried on the frame.

7. A supporting bracket-like member adapted to engage a portion of a concrete bridge and the like comprising a frame comprised of upright members and transverse members, said members being provided with means whereby they may be secured together for adjustment or transposition of the transverse members.

8. A supporting bracket-like member adapted to engage a portion of a concrete bridge and the like comprising a frame comprised of upright members and transverse members, said members being provided with means whereby the frame may be adjusted in width and the levels of the transverse members altered.

9. A supporting bracket-like member adapted to engage a portion of a concrete bridge and the like comprising a frame comprised of members separably secured together and adapted to embrace a portion of the bridge, and means passing through a portion of the bridge for detachably securing the members in place.

In testimony whereof, I have hereunto signed my name.

CHRISTIAN BRYNOLDT.